US009811591B2

(12) United States Patent
Chen et al.

(10) Patent No.: US 9,811,591 B2
(45) Date of Patent: Nov. 7, 2017

(54) INTERNATIONAL SEARCH ENGINE OPTIMIZATION ANALYTICS

(75) Inventors: Danwen Chen, New York, NY (US); Martin Luis Alonso Lago, Brooklyn, NY (US)

(73) Assignee: Conductor, Inc., New York, NY (US)

( * ) Notice: Subject to any disclaimer, the term of this patent is extended or adjusted under 35 U.S.C. 154(b) by 1009 days.

(21) Appl. No.: 13/591,575

(22) Filed: Aug. 22, 2012

(65) Prior Publication Data

US 2014/0059028 A1 Feb. 27, 2014

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
None
See application file for complete search history.

(56) References Cited

U.S. PATENT DOCUMENTS

| 8,015,183 | B2* | 9/2011 | Frank ............................ 707/724 |
| 8,606,800 | B2* | 12/2013 | Lagad et al. .................. 707/758 |
| 2005/0044076 | A1* | 2/2005 | Wu et al. ........................... 707/4 |
| 2008/0222140 | A1* | 9/2008 | Lagad et al. ...................... 707/5 |
| 2012/0130814 | A1* | 5/2012 | Hayes ......................... 705/14.54 |
| 2012/0271807 | A1* | 10/2012 | Smyth et al. ................. 707/706 |
| 2013/0046747 | A1* | 2/2013 | Gouyet ............. G06F 17/30864 707/709 |

OTHER PUBLICATIONS

Yi Chang, Ruiqiang Zhang, Srihari Reddy, Yan Liu, Detecting Multilingual and Multi-Regional Query Intent in Web Search, 2011 pp. 1134-1139.*

* cited by examiner

*Primary Examiner* — Thu Nga Nguyen
(74) *Attorney, Agent, or Firm* — Moritt Hock & Hamroff LLP; Steven S. Rubin, Esq.

(57) ABSTRACT

A system and method for generating search engine analytics data to be displayed on a display. A processor may send search queries to a first country search engine and to a second country search engine and receive first and second ranked result sets in response. The processor may generate search engine data for a domain based on the search queries, the first ranked result set, and the second ranked result set. The processor may further generate report data to be displayed on the display based on the search engine data. The report data may include data effective to display first analytics for the domain for the first country search engine and second analytics for the domain for the second country search engine. Analytics may represent trends of ranks over a time interval.

5 Claims, 5 Drawing Sheets

US 9,811,591 B2

INTERNATIONAL SEARCH ENGINE OPTIMIZATION ANALYTICS

BACKGROUND OF THE INVENTION

In a prior art search engine, a crawler aggregates pages from the Internet and ensures that these pages are searchable. The pages retrieved by the crawler are indexed by an indexer. For example, each web page may be broken down into words and respective locations of each word on the page. The pages are then indexed by the words and their respective locations. A user may send a search query to a dispatcher. The dispatcher may forward the query to search nodes. The search nodes search respective parts of the index and return search results along with a document identifier. The dispatcher merges the received results to produce a final result set displayed to a user sorted by ranking scores based on a ranking function. Users may modify web pages in an attempt to have their page appear higher in a result set for particular queries. This disclosure describes an improvement over these prior art technologies.

SUMMARY OF THE INVENTION

One embodiment of the invention is a method for generating report data to be displayed on a display. The method may include, by a processor sending search queries to a first country search engine. The method may include sending the search queries to a second country search engine. The method may include receiving first ranked result sets from the first country search engine based on the search queries. The method may include receiving second result sets from the second country search engine based on the search queries. The method may include generating search engine data for a domain based on the search queries, the first ranked result set, and the second ranked result set. The method may include generating report data to be displayed on the display based on the search engine data, the report data including data effective to display first analytics for the domain for the first country search engine and second analytics for the domain for the second country search engine.

One embodiment of the invention is a system effective to generate report data to be displayed on a display. The system may include a memory including instructions and a processor in communication with the memory. The processor may be effective to send search queries to a first country search engine. The processor may be effective to send the search queries to a second country search engine. The processor may be effective to receive first ranked result sets from the first country search engine based on the search queries. The processor may be effective to receive second result sets from the second country search engine based on the search queries. The processor may be effective to generate search engine data for a domain based on the search queries, the first ranked result set, and the second ranked result set. The processor may be effective to generate report data to be displayed on the display based on the search engine data. The report data may include data effective to display first analytics for the domain for the first country search engine and second analytics for the domain for the second country search engine.

One embodiment of the invention is a processor generated user interface on a display. The user interface may include first analytics for a domain for a first country search engine. The first analytics may be based on search queries input to a first country search engine and a first ranked result set received from the first country search engine in response. The user interface may include second analytics for the domain for the second country search engine. The second analytics may be based on the search queries sent to a second country search engine and a second ranked result set receive from the second country search engine in response.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
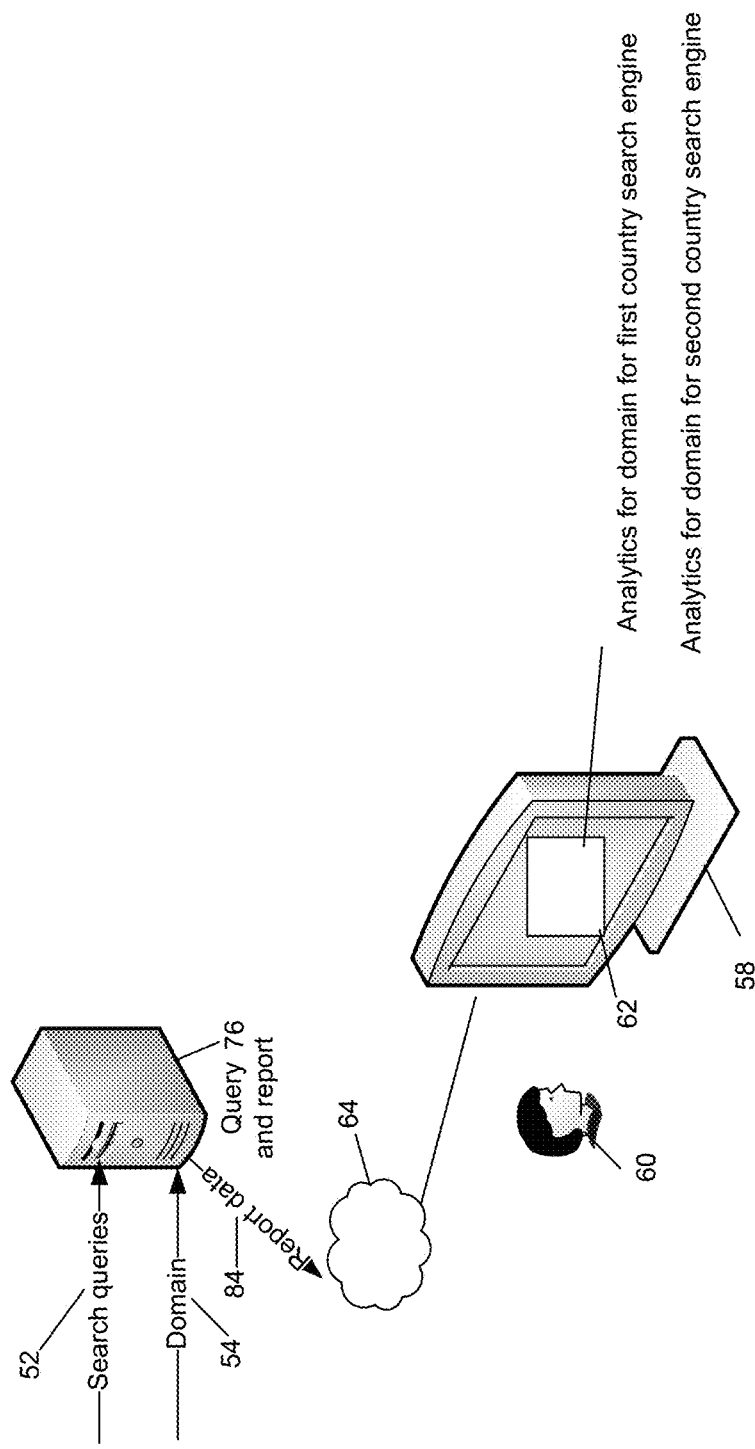
FIG. 1 is a system drawing of a system in accordance with an embodiment of the invention.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a system 50 in accordance with an embodiment of the invention. A user 60 may provide search queries 52 and a domain 54 to a query and report processor 76. Each search query 52 could be, for example, one or more characters, symbols, phrases and/or words. Domain 54 may be one or more Uniform Resource Locators (URLs) corresponding to addresses owned by user 60.

Query and report processor 76 receives search queries 52 and domain 54 and generates report data 84. Report data 84 may include international search engine optimization data such as data indicating ranks of domain 54 in result sets generated by a search engine for search queries 52. Report data 84 may be displayed as a report 62 to user 60 on a display 58. Query and report processor 76 may be in communication with user 60 and display 58 over a network 64 such as the Internet network. As discussed in more detail below, report 62 may include analytics for the domain for a first country search engine and a second country search engine. For example, the first country search engine and second country search engines may relate to the same search engine company operating different search engines in different countries. In an example, the first country search engine could be google.fr and the second country search engine could be google.it. As discussed herein, report 62 enables user 60 to view international search engine optimization analytics including ranks and trends of a domain over time in multiple countries.

Figure 2:
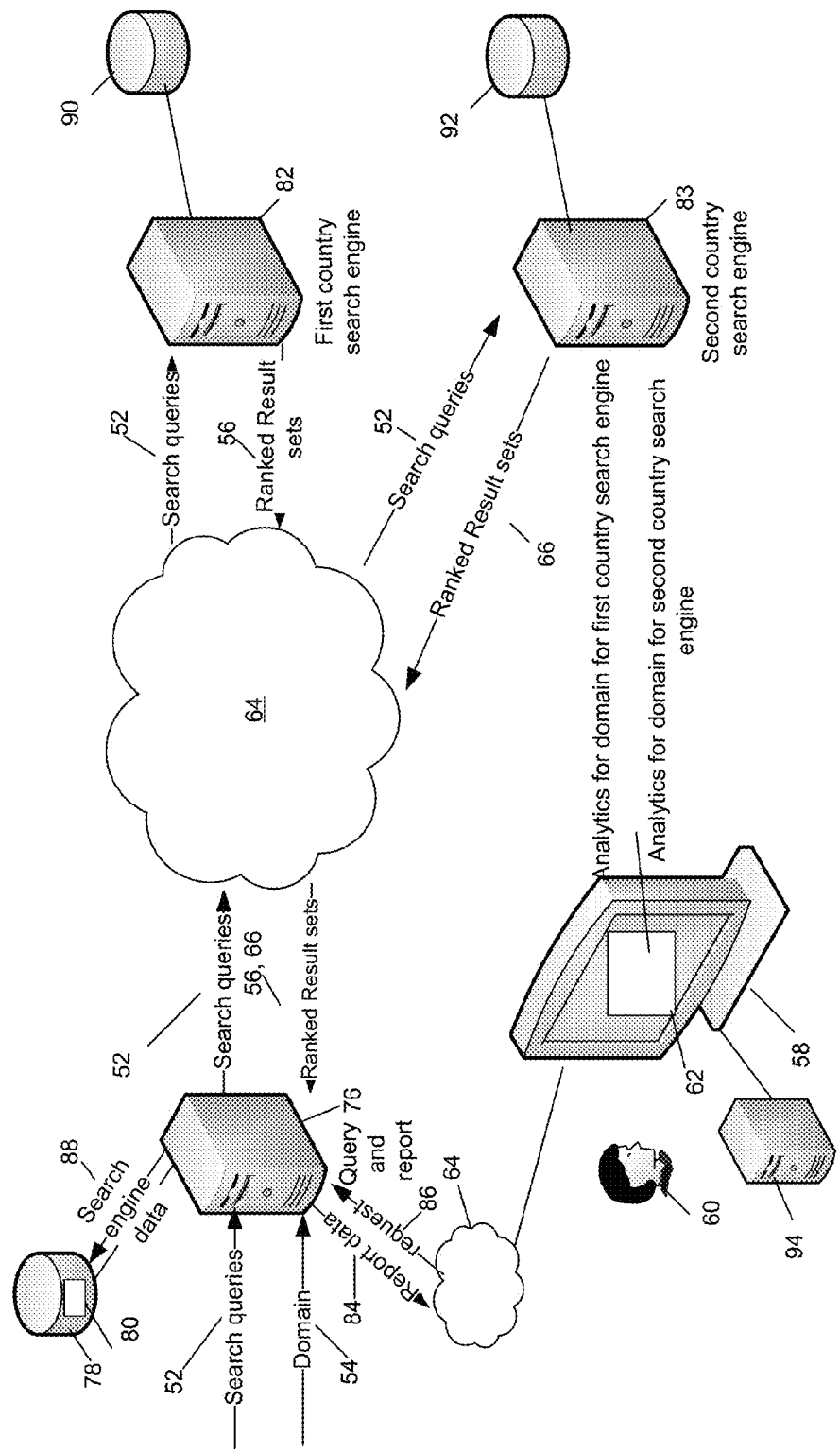
FIG. 2 is a system drawing of a system in accordance with an embodiment of the invention.

Referring to FIG. 2, query and report processor 76 may further be in communication with a memory 78 including instructions 80 and with a search engine 82 over network 64. Query processor 76 may receive search queries 52 and domain 54 from user 60 or from another source. Search queries 52 could include, for example, search queries relevant to a business and/or web site owned by user 60. Query and report processor 76 may send each search query 52 over network 64 to first country search engine 82. Query and report processor 76 may also send each search query 52 over network 64 to second country search engine 83. First and second country search engines 82, 83 could each be, for example, the GOOGLE search engine, the YAHOO! search engine, the BING search engine, BAIDU, etc. First and second country search engines 82, 83 may perform different ranking algorithms based on the respective countries they service.

First country search engine 82 may receive search queries 52 and search a web index 90 of the search engine for web pages and corresponding URLs that may include each search query 52. Search engine 82 may generate result sets listing web pages and URLs that include respective search queries 52. Search engine 82 may then rank each of the URLs in the result sets to produce ranked result sets 56 and send ranked result sets 56 over internet 64 to query and report processor 76.

Similarly, second country search engine 83 may receive search queries 52 and search a web index 92 of the search engine for web pages and corresponding URLs that may include each search query 52. Search engine 82 may generate result sets listing web pages and URLs that include respective search queries 52. Search engine 82 may then rank each of the URLs in the result sets to produce ranked result sets 66 and send ranked result sets 66 over internet 64 to query and report processor 76.

Query and report processor 76 may receive ranked result sets 56, 66 and generate search engine data 88 to be stored in memory 78. Search engine data 88 may reflect where domain 54 is ranked in ranked results sets 56 of first country search engine 82 and search country engine 83. Query and report processor 76 may use search engine data 88 to produce report data 84. Report data 84 may be processed to generate report 62 on display 58 such as through processing by a processor 94. Processor 94 may be in the same housing as display 58 (such as in a tablet device) or in a different housing as display 58. As explained in more detail below, user 60 may send request messages 86 to query and report processor 76 including requests for modifications to report data 84. Query and report processor 76 may receive request messages 86, analyze search engine data 88, and generate modified report data 84 in response.

Figure 3:
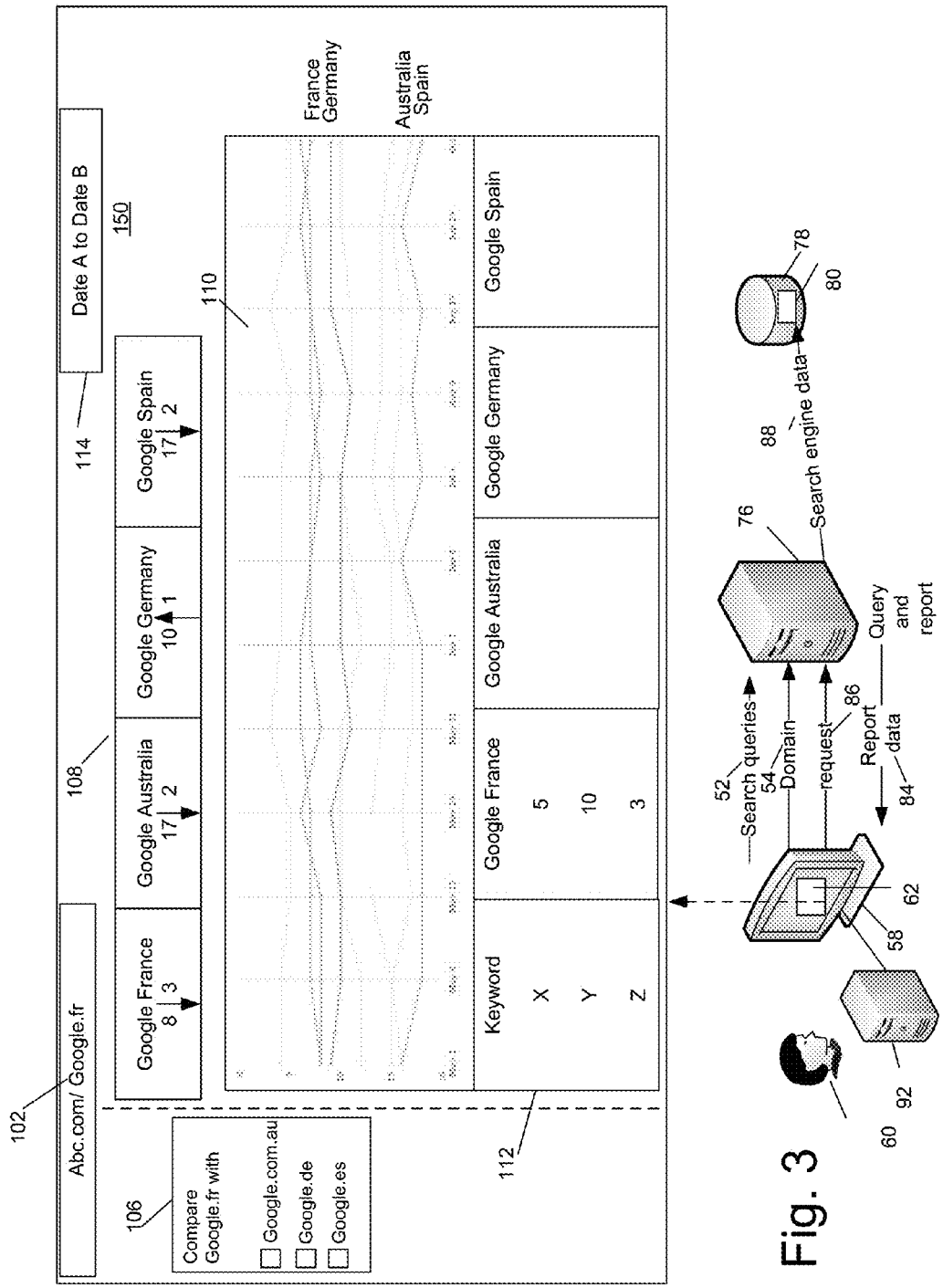
FIG. 3 is a system drawing of a system in accordance with an embodiment of the invention.

Referring to FIG. 3, report 62 may include analytics indicating how domain 54 is ranking for search queries input in search engines of different countries. An international comparison page 150 of report 62 for the domain "Abc.com" is shown in FIG. 3. International comparison page 150 may allow user 60 to see how domain 54 is ranking for search queries input in a search engine of a particular country. International comparison page 150 may allow user 60 to compare the ranking of a domain for a search engine in one country with rankings in other countries.

Search queries 52 may be tailored specific to a particular country's search engine. For example, for a search engine serving Mexico, search queries may be input in Spanish. Search queries 52 may be changed by user 60 depending on the country search engine of interest. For example, search queries may be translated into multiple languages. Alternatively, different search queries may be of interest depending on the country search engine for which the user requests analytics.

After user 60 inputs search queries 52 and domain 54, query and report processor 76 may start gathering search engine data 88. As time passes, search engine data 88 may be used to generate report data 84 including analytics such as identifying trends relating to search queries 52 and domain 54 for multiple country search engines. International comparison page 150 may include a domain/country field 102, a filter field 106, a keyword/country comparison for all keywords field 108, one or more charts 110, and a keyword/country comparison for specific keywords field 112. Domain/country field 102 may include an indication of domain 54 and a specific country search engine selected by user 60. In the example shown, user 60 has requested (such as by request 86) that analytics relating to domain "Abc.com", with a focus on the country search engine Google.fr, be displayed. International comparison page 150 further includes a time interval 114 for which the analytics are displayed.

Filter field 106 may include an interface enabling user 60 to compare the country search engine in domain/country field 102 with analytics for other country search engines. In the example, filter 106 may enable a user 60 to compare country search engine Google.fr with one or more of Google.com.au, Google.de or Google.es.

Keyword/country comparison for all keywords field 108 may provide an indication as to how many keywords result in domain 54 ranking in the top threshold of results for particular country search engines. Keyword/country comparison for all keywords field 108 may further indicate whether the number keywords resulting in domain 54 ranking has increased or decreased, and an amount of the increase or decrease.

Chart 110 may indicate how many keywords have resulted in domain 54 being ranked in the top threshold of results for particular country search engines over time. For example, as shown, a line graph may indicate how many keywords have resulted in domain 54 being ranked in the top threshold of results for the France country search engine. Another line graph may indicate how many keywords have resulted in domain 54 being ranked in the top threshold of results for the Germany country search engine. As both line graphs are displayed in the same chart 110, user 60 can view both graphs at the same time and make search engine optimization decisions accordingly.

Keyword/country comparison for specific keywords field 112 may list specific keywords and ranks of domain 54 for the specific keywords for county search engines. For example, keyword X is shown as ranking number 5 for domain 54 for the France country search engine. User 60 can thus see how various keywords have resulted in domain ranks across multiple country search engines.

Figure 4:
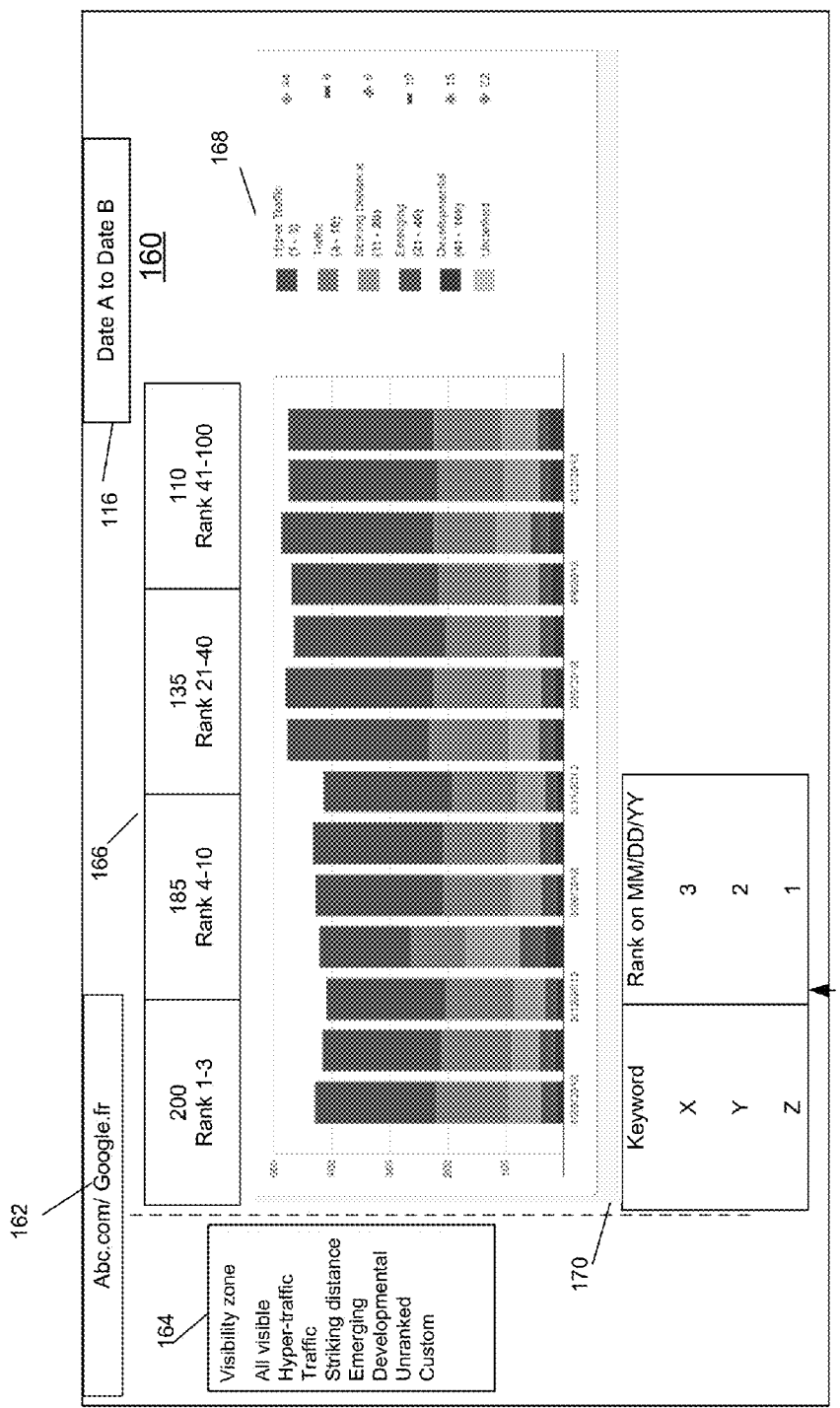
FIG. 4 is a system drawing of a system in accordance with an embodiment of the invention.

Referring to FIG. 4, report 62 may include a international search rankings page 160. International search rankings page 160 may include a domain/country field 162, a visibility zone filter 164, a rank distribution summary field 166, one or more charts 168 and a keyword/date field 170.

International search ranking page 160 may include a time interval 116 for which the analytics are displayed.

Domain/country field 162 may include an indication of domain 54 and a specific country search engine selected by user 60. Visibility zone filter 164 may provide a user interface filter allowing user 60 to filter a level of visibility of traffic to be displayed in international search ranking page 160. Visibility of traffic may correspond to a ranking of domain 54 for particular search queries above a particular threshold rank. For example, user 60 may be able to filter viewing all visible traffic, hyper-traffic (ranks 1-3), traffic (ranks 4-10), striking distance (ranks 11-20), emerging (ranks 21-40), developmental (ranks 41-100), unranked (over 100) or a custom range of ranks.

Rank distribution summary field 166 may indicate a number of keywords and particular ranks for the domain and country search engine identified in domain/country field 162. In the example, 200 keywords resulted in the domain being ranked in ranks 1-3 for domain Abc.com in country search engine Google.FR. Also in the example, 185 keywords resulted in the domain being ranked 4-10 for domain Abc.com in country search engine Google.FR.

Chart 168 may indicate a rank distribution of domain 54 for all keywords for the country search engine in field 162. Chart 168 may further provide information based on a timeline. For example, chart 168 may indicate that on a first date, a certain number of keywords resulted in the domain being in a first visibility zone and a second number of keywords resulted in the domain being in a second visibility zone. Keyword/date field 170 may indicate how specific keywords resulted in particular ranks for the domain on particular dates.

Among other benefits, a system in accordance with the disclosure provides a user with the ability to analyze a domain's analytics in multiple country's search engines on one display or user interface. Providing all of these analytics on one display enables the user to make better decisions regarding search engine optimization. A user can see how rankings are trending over time for one domain and can make modifications based on changes made to search engine optimization strategy. A user can see how a URL with a first country top level domain may rank in a search engine of another country. A user may look at analytics across multiple county's search engines for multiple periods of time. The user may monitor changes made based on search engine optimization strategy applied and make modifications to that strategy as desired.

Figure 5:
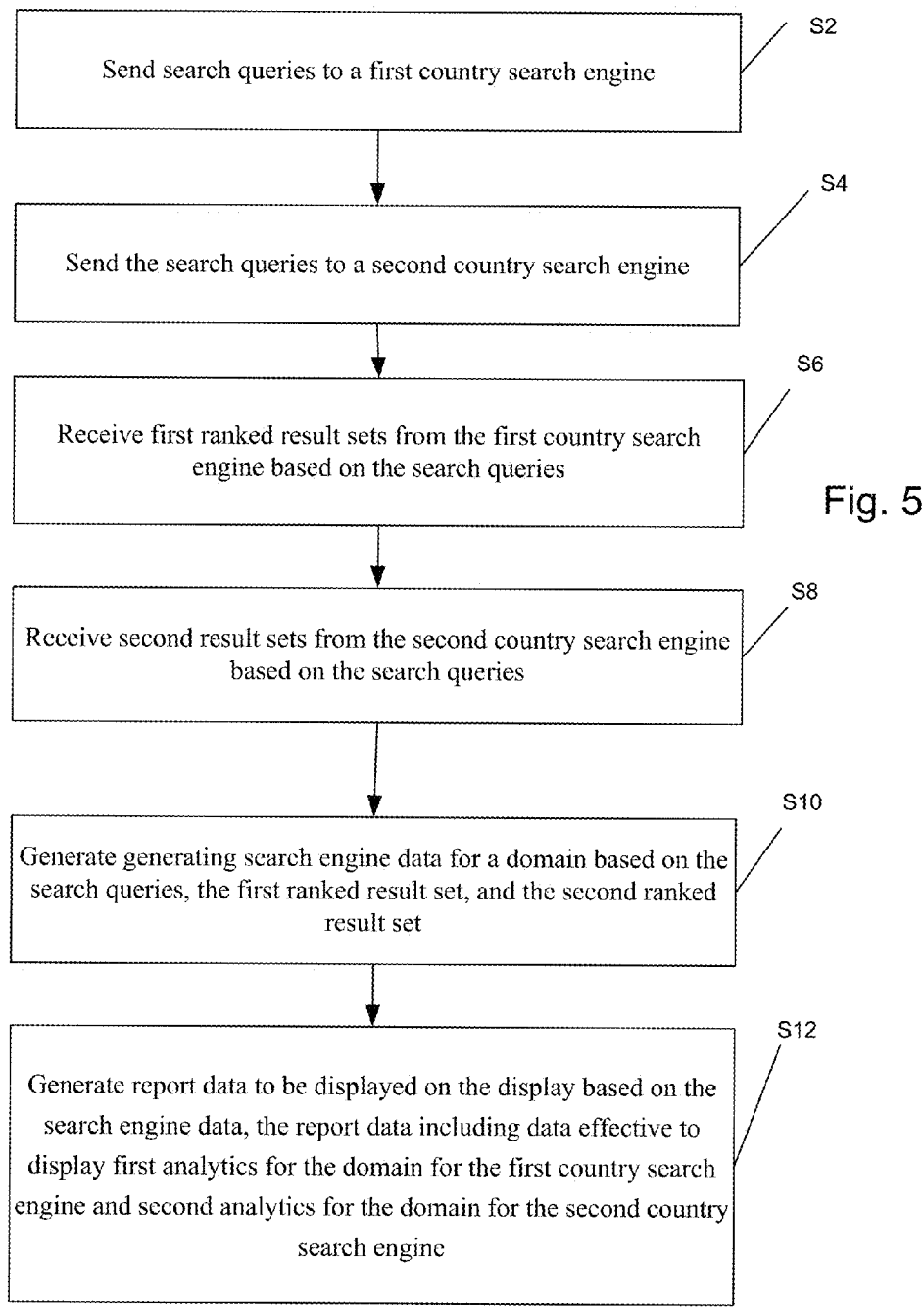
FIG. 5 is a flow chart illustrating a process which could be performed in a accordance with an embodiment of the invention.

Referring to FIG. 5, there is shown a process which could be performed in accordance with an embodiment of the invention. The process could be performed using, for example, system 50 discussed above and may be used to generate a report to be displayed on a display. As shown, at step S2, a processor may send search queries to a first country search engine. At step S4, the processor may send search queries to a second country search engine. At step S6, the processor may receive first ranked result sets from the first country search engine based on the search queries. At step S8, the processor may receive second ranked result sets from the second country search engine based on the search queries.

At step S10, the processor may generate search engine data for a domain based on the search queries, the first ranked result set and the second ranked result set. At step S12, the processor may generate report data to be displayed on the display based on the search engine data. The report data may include data effective to display first analytics for the domain for the first country search engine and second analytics for the domain for the second country search engine. The first analytics may indicate how the domain ranks for the search queries input to the first country search engine over a time interval and a number of keywords in the search queries that result in the domain ranking above a first threshold for the first country search engine during the time interval. The first analytics may further include a chart effective to indicate a number of keywords in the search queries that result in the domain ranking above a second threshold for the first country search engine during the time interval. The first analytics may include a specific keyword in the search queries and a rank of the domain for the specific keyword in the first country search engine during the time interval.

The second analytics may indicate how the domain ranks for the search queries in the second country search engine over the time interval, and a number of keywords in the search queries that result in the domain ranking above the first threshold for the second country search engine during the time period. The second analytics may further include the chart effective to indicate a number of keywords in the search queries that result in the domain ranking above the second threshold for the second search engine during the time period. The second analytics may include the specific keyword in the search queries and the rank of the domain for the specific keyword in the second country search engine during the time interval.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating report data to be displayed on a display, the method comprising, by a processor:
   sending search queries to a first country search engine;
   sending the search queries to a second country search engine, wherein the first country search engine is operated in a first country, the second country search engine is operated in a second country, and the first country is different from the second country;
   sending the search queries to a third country search engine;
   receiving first ranked result sets from the first country search engine based on the search queries;
   receiving second ranked result sets from the second country search engine based on the search queries;
   receiving third ranked result sets from the third country search engine based on the search queries;
   generating search engine data for a domain based on the search queries, the first ranked result set, the second ranked result set, and the third ranked results set;
   generating report data to be displayed on the display based on the search engine data, the report data including data effective to display first analytics for the domain for the first country search engine, second analytics for the domain for the second country search engine, and third analytics for the domain for the third country search engine; and
   causing a user interface to be displayed enabling a user to filter out the third analytics from the display; and wherein:
   the first analytics indicate
      how the domain ranks for the search queries input in the first country search engine during a time interval;

a number of keywords in the search queries that result in the domain ranking above a first threshold for the first country search engine during the time interval;

a chart effective to indicate a number of keywords in the search queries that result in the domain ranking above a second threshold for the first country search engine during the time interval;

a specific keyword in the search queries and a rank of the domain for the specific keyword input in the first country search engine during the time interval; and the second analytics indicate how the domain ranks for the search queries input in the second country search engine during the time interval;

a number of keywords in the search queries that result in the domain ranking above the first threshold for the second country search engine during the time interval;

the chart effective to indicate a number of keywords in the search queries that result in the domain ranking above the second threshold for the second search engine during the time interval; and the specific keyword in the search queries and the rank of the domain for the specific keyword input in the second country search engine during the time interval.

2. The method of claim 1, further comprising:

receiving a request to focus on analytics for the first country search engine; and modifying the report data to display the second analytics compared with the first analytics.

3. The method of claim 1, further comprising receiving the domain and the search queries from another processor.

4. A system effective to generate report data to be displayed on a display, the system comprising:

a memory including instructions;

a processor in communication with the memory, the processor effective to send search queries to a first country search engine;

send the search queries to a second country search engine, wherein the first country search engine is operated in a first country, the second country search engine is operated in a second country, and the first country is different from the second country;

send the search queries to a third country search engine;

receive first ranked result sets from the first country search engine based on the search queries;

receive second ranked result sets from the second country search engine based on the search queries;

receive third ranked result sets from the third country search engine based on the search queries;

generate search engine data for a domain based on the search queries, the first ranked result set, the second ranked result set, and the third ranked results set; and generate report data to be displayed on the display based on the search engine data, the report data including data effective to display first analytics for the domain for the first country search engine, second analytics for the domain for the second country search engine, and third analytics for the domain for the third country search engine; and cause a user interface to be displayed enabling a user to filter out the third analytics from the display; and wherein:

the first analytics indicate how the domain ranks for the search queries input in the first country search engine during a time interval;

a number of keywords in the search queries that result in the domain ranking above a first threshold for the first country search engine during the time interval;

a chart effective to indicate a number of keywords in the search queries that result in the domain ranking above a second threshold for the first country search engine during the time interval;

a specific keyword in the search queries and a rank of the domain for the specific keyword input in the first country search engine during the time interval; and the second analytics indicate how the domain ranks for the search queries input in the second country search engine during the time interval;

a number of keywords in the search queries that result in the domain ranking above the first threshold for the second country search engine during the time interval;

the chart effective to indicate a number of keywords in the search queries that result in the domain ranking above the second threshold for the second search engine during the time interval; and the specific keyword in the search queries and the rank of the domain for the specific keyword input in the second country search engine during the time interval.

5. The system of claim 4, wherein:

the first analytics indicate how the domain ranks for the search queries input in the first country search engine; and the second analytics indicate how the domain ranks for the search queries input in the second country search engine.

* * * * *